(12) United States Patent
Matsuda et al.

(10) Patent No.: US 8,813,803 B2
(45) Date of Patent: Aug. 26, 2014

(54) PNEUMATIC TIRE

(75) Inventors: Jun Matsuda, Kanagawa (JP); Tomoyuki Sakai, Kanagawa (JP)

(73) Assignee: The Yokohama Rubber Co., Ltd., Tokyo (JP)

(*) Notice: Subject to any disclaimer, the term of this patent is extended or adjusted under 35 U.S.C. 154(b) by 0 days.

(21) Appl. No.: 13/701,048

(22) PCT Filed: May 13, 2011

(86) PCT No.: PCT/JP2011/061063
§ 371 (c)(1),
(2), (4) Date: Jan. 21, 2013

(87) PCT Pub. No.: WO2011/152188
PCT Pub. Date: Dec. 8, 2011

(65) Prior Publication Data
US 2013/0146197 A1    Jun. 13, 2013

(30) Foreign Application Priority Data
Jun. 4, 2010  (JP) .................................. 2010-128440

(51) Int. Cl.
*B60C 13/00*    (2006.01)
*B60C 1/00*    (2006.01)
*B60C 13/04*    (2006.01)

(52) U.S. Cl.
CPC ........... *B60C 13/00* (2013.01); *B60C 2013/007* (2013.04); *B60C 1/0025* (2013.04); *B60C 2013/005* (2013.04); *B60C 13/04* (2013.01)
USPC ......................................................... 152/525

(58) Field of Classification Search
USPC ......................................................... 152/525
See application file for complete search history.

(56) References Cited

FOREIGN PATENT DOCUMENTS

| | | |
|---|---|---|
| JP | 6-040218 A | 2/1994 |
| JP | 6-092112 A | 4/1994 |
| JP | 6-211007 A | 8/1994 |
| JP | 7-276909 A | 10/1995 |
| JP | 2003-127619 A | 5/2003 |
| JP | 2003-127620 A | 5/2003 |

OTHER PUBLICATIONS

Machine translation of JP 2003-127620. (original document provided by Applicant).*
Machine translation of JP 6-040218. (original document provided by Applicant).*
Machine translation of JP 6-211007. (original document provided by Applicant).*

* cited by examiner

*Primary Examiner* — Ling Choi
*Assistant Examiner* — Catherine S Branch
(74) *Attorney, Agent, or Firm* — Carrier Blackman & Associates, P.C.; Joseph P. Carrier; Anne G. Sabourin

(57) ABSTRACT

To provide a pneumatic tire by which rolling resistance is reduced while cracking resistance in side wall portions is maintained. A foam rubber layer 6 extending in a tire radial direction is disposed in at least a portion of the side wall portion 3. Heat conductivity at 23° C. of the foam rubber layer 6 is from 0.05 to 0.20 W/mK, a tan δ at 60° C. is not more than 0.17, and an expansion ratio Q is from 50 to 160%.

13 Claims, 3 Drawing Sheets

PNEUMATIC TIRE

TECHNICAL FIELD

The present invention relates to a pneumatic tire, and more particularly relates to a pneumatic tire by which rolling resistance is reduced while cracking resistance in side wall portions is maintained.

BACKGROUND TECHNOLOGY

With the increased fuel economy in vehicles in recent years, there has been a strong demand for a pneumatic tire with reduced rolling resistance. Conventionally, various methods for reducing the rolling resistance of a pneumatic tire have been proposed dealing with structural aspects and material aspects, such as reducing the weight of the tire. However, all of these proposals have both merits and demerits and none have realized an absolutely satisfactory reduction in the rolling resistance.

In one aspect of the conventional technology, forming the side wall portions from a foam rubber layer has been proposed. However, when the side wall portions are formed from a foam rubber layer, there is a problem in that cracking resistance is negatively affected. Therefore, Patent Document 1 describes suppressing the negative effect on cracking resistance by setting a foam occupancy area ratio in the foam rubber layer to be low. However, if the foam occupancy area ratio in the foam rubber layer is lowered, heat generated when the tire is running will be easily transmitted from the foam rubber layer. As a result, there are problems in that the foam rubber layer cannot be used in temperature regions where the tan δ, which is deeply related to the rolling resistance of the tire, is lowered, and the effects of reducing the rolling resistance are insufficient. Patent Document 2 describes using a butyl rubber as a foam rubber layer. However, this is unsatisfactory because there are problems in that not only is the heat buildup in the rubber layer itself great, but adhesion with surrounding rubber is insufficient, and is unsuitable as a side wall layer where flexing is great from the perspective of durability. Thus, neither of these proposals has achieved an absolutely satisfactory reduction in the rolling resistance.

PRIOR ART DOCUMENTS

Patent Documents

Patent Document 1: Japanese Unexamined Patent Application Publication No. H06-92112
Patent Document 2: Japanese Unexamined Patent Application Publication No. H07-276909

SUMMARY OF THE INVENTION

Problems to be Solved by the Invention

An object of the present invention is to provide a pneumatic tire by which rolling resistance is reduced while cracking resistance in side wall portions is maintained.

Means for Resolving Problems

A pneumatic tire of the present invention that achieves the object described above includes a left-right pair of bead portions, a side wall portion continuous with the bead portions, and a tread portion connected to the side wall portion, a carcass layer being mounted between the left-right bead portions. In such a pneumatic tire, a foam rubber layer extending in a tire radial direction is disposed in at least a portion of the side wall portion, heat conductivity at 23° C. of the foam rubber layer is from 0.05 to 0.20 W/mK, a tan δ at 60° C. of the foam rubber layer is not more than 0.17, and an expansion ratio Q as defined in formula (1) below is from 50 to 160%.

$$\text{Expansion ratio } Q(\%)=[(D0/D1)-1]\times 100 \quad (1)$$

In this formula, $D0$ is a specific weight of the foam rubber layer before foaming and $D1$ is a specific weight after foaming.

Furthermore, the configuration described above is preferably configured according to at least one of the following (a) to (d).

(a) The side wall portion includes a plurality of rubber layers disposed on an outer side in a tire width direction of the carcass layer, and at least one layer of the plurality of rubber layers is constituted by the foam rubber layer or, alternately, the side wall portion comprises a single rubber layer disposed on the outer side in the tire width direction of the carcass layer, and the rubber layer is constituted by the foam rubber layer. In the case of the latter, a region positioned on an outer side in the tire radial direction of the foam rubber layer can be formed by a non-foam rubber layer instead of the foam rubber layer.

(b) The foam rubber layer constitutes not less than 30% of the total volume of the rubber layer forming the side wall portion.

(c) The foam rubber layer is formed from a foaming rubber composition, and the foaming rubber composition includes a diene rubber and, per 100 parts by weight thereof, from 0.1 to 20 parts by weight of a chemical foaming agent, from 1 to 10 parts by weight of resorcin or resorcin resin, and from 1 to 15 parts by weight of a curing agent of the resorcin and the resorcin resin. Additionally, the foaming rubber composition can include from 20 to 100 parts by weight of a filler per 100 parts by weight of the diene rubber. The curing agent of the resorcin and the resorcin resin that are included in the foaming rubber composition can be polyvalent methoxymethylol melamine and/or hexamethylene tetramine. The chemical foaming agent included in the foaming rubber composition can be a nitroso foaming agent and/or an azo foaming agent. Furthermore, the foaming rubber composition can include from 0.1 to 20 parts by weight of urea per 100 parts by weight of the diene rubber. The diene rubber included in the foaming rubber composition can include not less than 20 wt % of a natural rubber in 100 wt % of the diene rubber.

(d) When the side wall portion includes the plurality of rubber layers disposed on the outer side in the tire width direction of the carcass layer, and at least one layer of the plurality of rubber layers is constituted by the foam rubber layer, a reinforcing rubber layer including coated fiber cords is disposed so as to be adjacent to the foam rubber layer. The fiber cords included in the reinforcing rubber layer can include at least one type of fiber selected from the group consisting of polyester fiber, rayon fiber, and polyamide fiber.

Effect of the Invention

With the pneumatic tire of the present invention, the foam rubber layer extending in the tire radial direction is disposed in at least a portion of the side wall portion, and the heat conductivity at 23° C. of the foam rubber layer is from 0.05 to 0.20 W/mK, the tan δ at 60° C. is not more than 0.17, and the expansion ratio Q is from 50 to 160%. Therefore, the rolling resistance can be reduced because the weight of the tire can be reduced as a result of the disposal of the foam rubber layer, and the foam rubber layer can be used in temperature regions where the tan δ is lowered due to the thermal insulation effects and the thermal accumulation effects of heat generated when the tire is running by the foam rubber layer. Furthermore, the expansion ratio of the foam rubber layer is set to be from 50 to 160%. Therefore, cut resistance in the side wall portion can be ensured and heat dissipation in the foam rubber layer can be suppressed. As a result, the rolling resistance can be effectively reduced.

DETAILED DESCRIPTION OF THE INVENTION

Detailed descriptions will be given below of a configuration of the present invention with reference to the accompanying drawings. Note that in the present invention, the term "side wall portion" refers to the "portion between the tread and the bead" as stipulated in JATMA Vehicle-use Tire Safety Standards.

Figure 1:
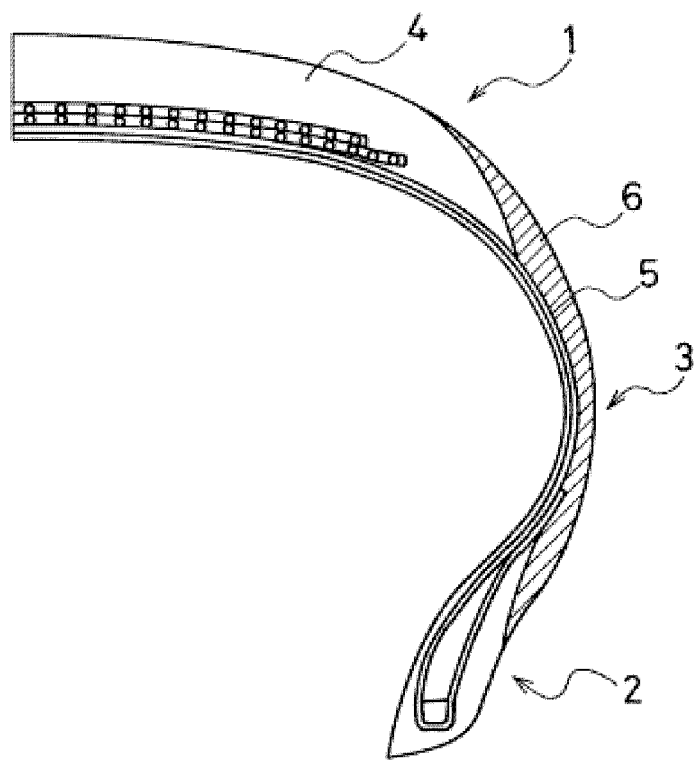
FIG. 1 is a half cross-sectional view of an example of an embodiment of a pneumatic tire of the present invention.

In FIG. 1, a pneumatic tire 1 of the present invention includes a left-right pair of bead portions 2,2, side wall portions 3,3 continuous with the bead portions 2,2, and a tread portion 4 connected to the side wall portions 3,3. A carcass layer 5 is mounted between the left-right bead portions 2,2.

A foam rubber layer 6 (depicted by slanted lines in the drawings) extending in a tire radial direction is disposed in at least a portion (an entirety in the example of FIG. 1) of the side wall portion 3. Heat conductivity at 23° C. of the foam rubber layer 6 is from 0.05 to 0.20 W/mK, a tan δ at 60° C. is not more than 0.17, and an expansion ratio Q is from 50 to 160%.

As a result, the rolling resistance can be reduced because the weight of the tire can be reduced as a result of the disposal of the foam rubber layer 6, and the foam rubber layer 6 can be used in temperature regions where the tan δ is small due to the thermal insulation effects and the thermal accumulation effects of heat generated when the tire is running by the foam rubber layer 6. Note that in the example of FIG. 1, the foam rubber layer 6 is formed so as to be exposed on an outer wall of the side wall portion 3. The outer wall of the foam rubber layer 6 contacts a mold when vulcanization is performed and is subjected to pressure. Therefore, vulcanization is prioritized ahead of foaming and, as a result, a thin film, with an expansion ratio of substantially zero and that is formed from an aggregate of minute air bubbles, can be formed on a surface of the outer wall of the foam rubber layer 6. Cut resistance in the side wall portion 3 can be ensured as a result of the forming of the thin film.

More specifically, a portion exists on the outer wall side of the foam rubber layer 6 where air bubbles formed by the foaming essentially do not exist, and the size and number of the air bubbles gradually increases towards the inner surface side of the foam rubber layer 6. Moreover, depending on the vulcanization conditions of the tire, vulcanization is prioritized ahead of foaming due to heat from a bladder, and the size and number of the air bubbles gradually decreases with proximity to the carcass layer 5.

In the present invention, the heat conductivity of the foam rubber layer 6 is from 0.05 to 0.20 W/mK and preferably from 0.07 to 0.18 W/mK. The heat conductivity is adjusted by selecting a rubber component in the rubber composition forming the foam rubber layer 6 and a foaming agent and a foaming aid compounded therein. If the heat conductivity of the foam rubber layer 6 is less than 0.05 W/mK, it will be necessary to increase the expansion ratio which, while advantageous from the perspective of reducing the weight of the tire, results in difficulties in ensuring the cut resistance in the side wall portion 3. If the heat conductivity exceeds 0.20 W/mK, conductivity of heat generated when the tire is running will be facilitated, and it will be difficult to reduce the rolling resistance of the foam rubber layer due to the effects of heat dissipation. In the present invention, the heat conductivity of the foam rubber layer is measured in accordance with ISO8301.

In the present invention, an expansion ratio Q (%) of the foam rubber layer as defined in formula (1) below is from 50 to 160% and preferably from 70 to 160%. As a result, weight reduction and reduction of rolling resistance and cracking resistance can be achieved.

$$\text{Expansion ratio } Q(\%) = [(D0/D1) - 1] \times 100 \quad (1)$$

In this formula, D0 is a specific weight of the foam rubber layer before foaming and D1 is a specific weight after foaming.

If the expansion ratio Q is less than 50%, it will be difficult to suppress the heat conductivity of the foam rubber layer 6 and the effects of reducing the rolling resistance will be insufficient. Additionally, it will not be possible to sufficiently reduce the weight of the foam rubber layer 6. If the expansion ratio Q exceeds 160%, it will be difficult to ensure the cracking resistance in the side wall portion 3.

Note that, the "specific weight D0" before the foaming of the foam rubber layer 6 is the specific weight before vulcanizing and foaming the rubber composition forming the foam rubber layer 6. This corresponds to a specific weight of vulcanized rubber in a non-foamed state when the rubber composition forming the foam rubber layer 6 is prepared without compounding the foaming agent and the foaming aid and vulcanized. The "specific weight D1" after the foaming of the foam rubber layer 6 is a specific weight of vulcanized, foamed rubber after the rubber composition forming the foam rubber layer 6 is vulcanized and foamed. In the present invention, the specific weight D0 before the foaming of the foam rubber layer 6 and the specific weight D1 after the foaming are measured in accordance with JISK-6268.

In the present invention, the tan δ at 60° C. of the foam rubber layer 6 is adjusted to be not more than 0.17 and preferably not more than 0.15. By setting the tan δ at 60° C. of the foam rubber layer 6 to be not more than 0.17, heat buildup can be reduced and, therefore, the rolling resistance of the foam rubber layer 6 when included in a tire can be more reliably reduced.

In the present invention, the heat conductivity at 23° C. of the foam rubber layer 6 must be from 0.05 to 0.20 W/mK, the tan δ at 60° C. must be not more than 0.17, and the expansion ratio Q must be from 50 to 160%. As a result of these three conditions being fulfilled, the weight of the pneumatic tire can be reduced, and rolling resistance can be reduced while ensuring the cracking resistance in the side wall portion 3. If any of the three conditions described above are not fulfilled, it will be difficult to achieve the desired results.

Figure 2:
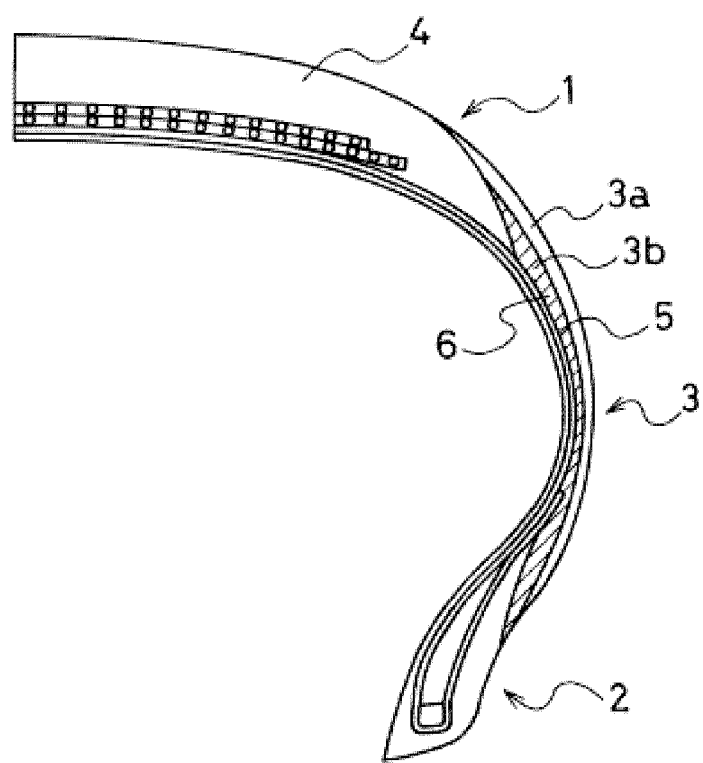
FIG. 2 is a half cross-sectional view of another example of the embodiment of the pneumatic tire of the present invention.
Figure 3:
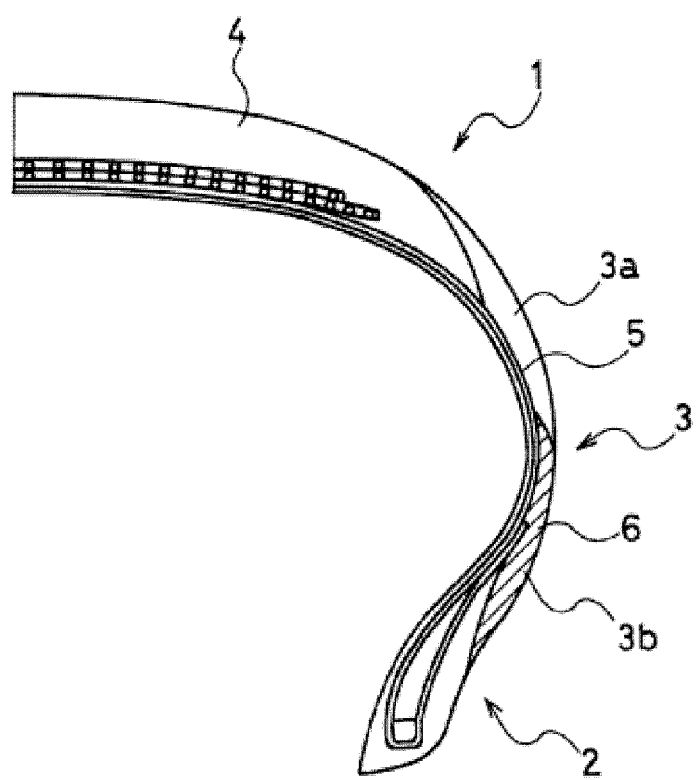
FIG. 3 is a half cross-sectional view of yet another example of the embodiment of the pneumatic tire of the present invention.

The embodiment of FIG. 1 illustrates a case where the side wall portion 3 is formed from a single rubber layer disposed on an outer side in the tire width direction of the carcass layer 5, and this rubber layer is constituted by the foam rubber layer 6. In the pneumatic tire of the present invention, as illustrated in FIGS. 2 and 3, the side wall portion 3 can be formed from a plurality of rubber layers (two layers in the drawings) 3a,3b disposed on the outer side in the tire width direction of the carcass layer 5, and at least one layer of the plurality of rubber layers 3a,3b (3b in the drawings) is constituted by the foam rubber layer 6 (depicted by slanted lines in the drawings). FIG. 2 illustrates an embodiment where the side wall portion 3 on the outer side in the tire width direction of the carcass layer 5 is constituted by the rubber layer 3b disposed on an inner side in the tire width direction and the rubber layer 3a disposed on the outer side in the tire width direction. Additionally, of these rubber layers 3a,3b, the rubber layer 3b on the inner side in the width direction is constituted by the foam rubber layer 6. FIG. 3 illustrates an embodiment where the side wall portion 3 on the outer side in the tire width direction of the carcass layer 5 is constituted by the rubber layer 3b disposed on an inner side in the tire radial direction and the rubber layer 3a disposed on the outer side in the tire radial direction. Additionally, of these rubber layers 3a,3b, the rubber layer 3b on the inner side in the radial direction is constituted by the foam rubber layer 6. Note that the disposal of the foam rubber layer and the non-foam rubber layer are not limited to the examples illustrated in FIGS. 2 and 3. That is, the number of rubber layers forming the side wall portion and the position of the foam rubber layer among the rubber layers are not limited.

Additionally, as illustrated in FIG. 3, a region (the rubber layer 3a) positioned on the outer side in the tire radial direction of the foam rubber layer 6 depicted in FIG. 1 can be formed by a non-foam rubber layer instead of the foam rubber layer 6. Thus, by replacing the region corresponding to a flex zone on the outer side in the tire radial direction of the side wall portion 3, which is subjected to excessive flexing strain, with the non-foam rubber layer having superior fatigue resistance and cut resistance instead of with the foam rubber layer 6, cracking resistance in the side wall portion 3 can be reliably enhanced.

Note that in the pneumatic tire 1 of the present invention, depending on the characteristics required from the tire, the combination of the non-foam rubber layer and the foam rubber layer 6 on the outer side and the inner side in the tire radial direction may be configured so that the outer side in the tire radial direction is constituted by the foam rubber layer 6, and the inner side in the tire radial direction is constituted by the non-foam rubber layer.

In the present invention, of the rubber layers forming the side wall portion 3, a volume that the foam rubber layer 6 constitutes is adjusted to be not less than 30% and preferably not less than 50% of a total volume of the rubber layers forming the side wall portion 3. As a result, the rolling resistance can be reliably reduced. Additionally, the weight of the pneumatic tire can be reduced.

In the present invention, the rubber composition forming the side wall portion 3 is not particularly limited, but the foam rubber layer 6 is preferably formed from the foaming rubber composition. Examples of rubber components that can be preferably used in the foaming rubber composition include natural rubber, isoprene rubber, butadiene rubber, styrene-butadiene rubber, and similar diene rubbers; and ethylene propylene rubber and similar olefin rubbers. A single rubber component can be used or an arbitrary blend of rubber components can be used. Of these, natural rubber is preferably included, and a content of the natural rubber in 100 wt % of the rubber component is preferably not less than 20 wt % and more preferably from 30 to 100 wt %. By setting the content of the natural rubber to be within this range, rubber strength of the foam rubber layer can be increased.

A carbon diamide foaming agent or a nitroso foaming agent is preferably used as the foaming agent and, as necessary, a urea foaming aid can be preferably compounded. By compounding such a urea foaming aid, it will be possible to efficiently pyrolize the foaming agent at a vulcanization temperature of the tire (typically from about 150 to 175° C.), and the desired foam rubber layer 6 can be obtained.

In the present invention, the foaming rubber composition suitable for use includes a diene rubber and, per 100 parts by weight thereof, preferably from 0.1 to 20 parts by weight of a chemical foaming agent, from 1 to 10 parts by weight of resorcin or resorcin resin, and from 1 to 15 parts by weight of a curing agent of the resorcin and the resorcin resin. As a result, the curing reaction of the resorcin and the resorcin resin will be carried out before the chemical foaming and vulcanization proceeds when heating, and a fine net-like structure is formed. Therefore, gas produced from the chemical foaming thereafter can be suppressed from leaking out of the foam rubber layer 6 during the heating process, and the foaming of the rubber layer can be effectively performed. Thus, the expansion ratio of the foam rubber layer 6 can be increased even though the compounded amount of the chemical foaming agent is reduced. Additionally, by reducing the compounded amount of the chemical foaming agent, vulcanization, which competes with the chemical foaming, will not be inhibited by the chemical foaming and the crosslinking density of the vulcanized rubber can be increased. Moreover, the rubber matrix will be hardened by the cured product of the resorcin and the resorcin resin and, as a result, the rubber strength of the vulcanized foam rubber layer 6 can be increased. Furthermore, by increasing the crosslinking density, the tan δ of the foam rubber layer 6 can be reduced.

The foaming rubber composition preferably includes the resorcin or the resorcin resin, and a curing agent thereof. By including the resorcin or the resorcin resin and the curing agent thereof, when heating the foaming rubber composition, the curing of the resorcin or the resorcin resin will be carried out before the chemical foaming and vulcanization and, as a result, a fine net-like structure formed from the resorcin and the resorcin resin will be formed. When the temperature rises higher thereafter and the chemical foaming occurs, the produced foaming gas can be suppressed from leaking out from the foam rubber layer 6 during the heating process because the fine net-like structure supports the unvulcanized rubber. That is, the foaming gas effectively functions to foam within the foam rubber layer 6, and the expansion ratio can be further increased. Thus, even though the compounded amount of the chemical foaming agent is reduced, the expansion ratio can be increased.

In the foaming/vulcanization molding of the foam rubber layer 6 formed from the foaming rubber composition, the chemical foaming and the vulcanizing are conflicting reactions. Therefore, if one of the reactions is prioritized, the other reaction will be inhibited. As described above, by including the resorcin or the resorcin resin and the curing agent thereof, the expansion ratio can be increased even though the compounded amount of the chemical foaming agent is reduced. Therefore, the progression of the vulcanization can be easily regulated and the crosslinking density of the vulcanized foam rubber layer 6 can be increased. The rubber strength can be increased because the crosslinking density is increased and the rubber matrix is hardened by the net-like structure formed by the resorcin or the resorcin resin. Furthermore, a loss tangent (tan δ) can be reduced and heat buildup can be reduced because the crosslinking density of the foam rubber layer is increased.

Examples of the resorcin and the resorcin resin include products that are regularly used in industrial-use rubber compositions. Resorcin resin is a compound obtained by reacting resorcin with formaldehyde, and examples thereof include Penacolite Resin B-18-S, B-19-S, B-20-S, and B-21-S (all manufactured by INDSPEC Chemical Corporation), and Sumikanol 620 (manufactured by Sumitomo Chemical Co., Ltd.).

A compounded amount of the resorcin and the resorcin resin is preferably from 1 to 10 parts by weight and more preferably from 2 to 8 parts by weight per 100 parts by weight of the diene rubber. If the compounded amount of the resorcin and the resorcin resin is less than 1 part by weight, it will not be possible to sufficiently form the fine net-like structure of the resorcin and the resorcin resin at initial stage of heating. If the compounded amount of the resorcin and the resorcin resin exceeds 10 parts by weight, the crosslinking density will be excessively high, and foaming will be inhibited.

Products that are regularly used in industrial-use rubber compositions can be used as the curing agent of the resorcin and the resorcin resin and examples thereof include polyvalent methoxymethylol melamines such as hexamethoxy methylolmelamine, pentamethoxymethylol melamine, and the like, hexamethylene tetramine, hexamethoxy methylmelamine, hexaethoxy methylmelamine, and the like. Preferable examples of the curing agent include polyvalent methoxymethylol melamines and/or hexamethylene tetramines. A single curing agent can be used or a combination of a plurality of curing agents can be used. Such a resin curing agent is known, and examples of commercially available products that can be used include Sumikanol 507A (manufactured by Sumitomo Chemical Co., Ltd.), Cyrez 964 RPC (manufactured by Cytec Industries INC.), Sanceler H-T (manufactured by Sanshin Chemical Industry Co., Ltd.), and the like.

A compounded amount of the curing agent of the resorcin and the resorcin resin is preferably from 1 to 15 parts by weight and more preferably from 3 to 12 parts by weight per 100 parts by weight of the diene rubber. If the compounded amount of the curing agent is less than 1 part by weight, it will not be possible to sufficiently form the fine net-like structure formed from the resorcin, the resorcin resin, and the curing agent at initial stage of heating. Additionally, the compounded amount of the curing agent is preferably from 1 to 2 times the compounded amount (parts by weight) of the resorcin and the resorcin resin. If the compounded amount is less than 1 times (equivalent weight), crosslinking reaction of the resorcin resin and the rubber will be insufficient and benefits will be small. If the compounded amount exceeds 2 times, the effects will level out and the mechanical strength of the rubber will decline.

In the present invention, the rubber composition forming the foam rubber layer includes a chemical foaming agent. The rubber molded body can be foamed because the chemical foaming agent is included. A compounded amount of the chemical foaming agent is preferably from 0.1 to 20 parts by weight and more preferably from 1.0 to 15 parts by weight per 100 parts by weight of the diene rubber. If the compounded amount of the chemical foaming agent is less than 0.1 parts by weight, foaming when vulcanizing will be insufficient and it will not be possible to increase the expansion ratio. Additionally, if the compounded amount of the chemical foaming agent exceeds 20 parts by weight, the effects of increasing the expansion ratio will level off regardless of an increase in cost, and the flatness of the foam surface will decline.

Examples of the chemical foaming agent include nitroso foaming agents, azo foaming agents, carbon diamide foaming agents, sulfonyl hydrazide foaming agents, azide foaming agents, and the like. Of these, nitroso foaming agents and/or azo foaming agents are preferable. A single chemical foaming agent may be used or a combination of two or more types of chemical foaming agents can be used.

Examples of the nitroso foaming agents include N,N'-dinitroso-pentamethylene tetramine (DPT), N,N'-dimethyl-N,N'-dinitroso-terephthalamide, and the like. Examples of the azo foaming agents include azobisisobutyronitrile (AZBN), azobiscyclohexylnitrile, azodiaminobenzene, bariumazodicarboxylate, and the like. Examples of the carbon diamide foaming agents include azodicarbonamide (ADCA), and the like; examples of the sulphonyl hydrazide foaming agents include benzenesulphonylhydrazide (BSH), p,p'-oxybis(benzenesulphonylhydrazide)(OBSH), toluenesulphonylhydrazide (TSH), diphenylsulphones-3,3'-disulphonylhydrazide, and the like; and examples of the azide foaming agents include calciumazide, 4,4'-diphenyldisulphonylazide, p-toluenesulphonylazide, and the like.

A decomposition temperature of the chemical foaming agent is preferably from 130° C. to 190° C. and more preferably from 150° C. to 170° C. By configuring the decomposition temperature of the chemical foaming agent to be within this range, control of the chemical foaming and the vulcanization will be facilitated. In the present specification, the decomposition temperature of the chemical foaming agent is a temperature determined by measuring decomposition heat and weight decrease using a heat analysis method selected from differential scanning calorimetry (DSC) and thermogravimetry (TGA).

Note that thermal expanding microcapsules formed by encapsulating a thermal expanding material in a shell material formed from a thermoplastic resin are known as the foaming agent. However, in the present invention, if thermal expanding microcapsules are used for the foam rubber layer 6, the tan δ will increase because the shell material exists in the foam rubber layer 6. As a result, it would be difficult to configure the tan δ at 60° C. of the foam rubber layer 6 to be not more than 0.17, and it would not be possible to reduce the rolling resistance. Thus, preferably a chemical foaming agent other than thermal expanding microcapsules is used as the foaming agent.

The foaming rubber composition preferably includes urea along with the chemical foaming agent. The urea acts as a foaming aid. By compounding the urea foaming aid, it is possible to set the temperature at which the chemical foaming agent pyrolizes to be low. A compounded amount of the urea foaming aid is preferably from 0.1 to 20 parts by weight and more preferably from 0.5 to 10 parts by weight per 100 parts by weight of the diene rubber. If the compounded amount of the urea foaming aid is less than 0.1 parts by weight, it will not be possible to sufficiently regulate the pyrolysis temperature of the chemical foaming agent. Additionally, the compounded amount of the urea foaming aid is preferably from 0.5 to 1.5 times the compounded amount of the chemical foaming agent. If the compounded amount is less than 0.5 times, effects as an aid will not be obtained and, if the compounded amount exceeds 1.5 times, the urea foaming aid will not react and will remain as a foreign object in the composition, leading to a decrease in mechanical strength.

In the present invention, the rubber strength of the foaming rubber composition can be increased by compounding a filler. A compounded amount of the filler is preferably from 20 to 100 parts by weight and more preferably from 40 to 80 parts by weight per 100 parts by weight of the diene rubber. If the compounded amount of the filler is less than 20 parts by weight, it will not be possible to sufficiently increase the rubber strength of the foaming rubber composition. Additionally, if the compounded amount of the filler exceeds 100 parts by weight, processability of the foaming rubber composition will decline.

Examples of the filler include carbon black, silica, calcium carbonate, clay, mica, diatomaceous earth, talc, and the like. Of these, carbon black, silica, and calcium carbonate are preferable. A single filler may be used or multiple fillers may be blended and used.

The foaming rubber composition can include compounding agents commonly used in industrial-use rubber compositions and rubber foams. Examples thereof include vulcanizing agents, vulcanization accelerators, vulcanization aids, rubber reinforcing agents, softeners (plasticizers), antiaging agents, processing aids, foaming aids, defoaming agents, activators, mold release agents, heat resistant stabilizers, weather resistant stabilizers, anti-static agents, colorants, lubricants, thickening agents, and the like. Provided that the object of the present invention is not obstructed, commonly used compounded amounts of these compounding agents can be used, and these compounding agents can be added, kneaded, or mixed according to a common preparation method.

In the present invention, the rubber composition forming the non-foam rubber layer (e.g. the rubber layer 3a in FIGS. 2 and 3) of the side wall portion can be applied to a common rubber composition forming the side wall portion 3. Additionally, the non-foam rubber layer can be a reinforcing rubber layer formed by coating fiber cords. Typically, if the foam rubber layer formed by the foaming rubber composition and the non-foam rubber layer formed from the reinforcing rubber layer including coated fiber cords, are laminated or, in other words, disposed so as to be adjacent to each other, when foaming and vulcanization molding, the foaming gas migrates to the reinforcing rubber layer in the pressurized mold and easily accumulates around the fiber cords that form the reinforcing rubber layer. Therefore, when the pressure is released in order to remove the foam rubber molded body from the mold, the foaming gas that has accumulated locally around the fiber cords expands locally without contributing to the foaming of the rubber matrix. As a result, in some cases, molding defects may occur in which small half-balloon shaped air pockets (hemispheres with diameters of 5 mm or greater) are formed in a portion of the foam rubber layer.

In contrast, when the foam rubber layer is formed from the foaming rubber composition including the resorcin or the resorcin resin and the curing agent thereof, as described above, the foaming gas does not easily migrate from the foam rubber layer. Therefore, accumulation of pressurized foaming gas around the fiber cords of the adjacent reinforcing rubber layer can be suppressed. As a result, the molding defect where small half-balloon shapes are formed in a portion of the foam rubber layer after removal from the mold can be prevented.

The fiber cords included in the reinforcing rubber layer are not particularly limited and can include at least one type of fiber selected from the group consisting of polyester fiber, rayon fiber, and polyamide fiber. By using the fiber cords described above, stretching of the reinforcing rubber layer can be limited to directions other than the fiber direction.

In the present invention, the side wall portion includes the foam rubber layer formed from the foaming rubber composition, and the foam rubber laminate formed by laminating the foam rubber layer formed from the foaming rubber composition and the reinforcing rubber layer. Therefore, weight can be reduced and the rolling resistance can be reduced while ensuring the cut resistance and the mechanical strength and maintaining durability. As a result, fuel economy performance can be enhanced. Thus, the pneumatic tire of the present invention can be applied widely to recent high performance vehicles, where fuel economy is an important issue.

EXAMPLES

Preparation and Evaluation of the Foaming Rubber Composition

Compounding ingredients other than the sulfur, the vulcanization accelerator, the curing agent, the chemical foaming agent, and the urea foaming aid were weighed according to each of the compositions for the 12 types of rubber compositions shown in Tables 1 and 2 (Working Examples 1 to 6, and Comparative Examples 1 to 6). These compounding ingredients were kneaded in a 1.7 L Banbury Mixer for 5 minutes. Then, a master batch was discharged at a temperature of 150° C. and cooled at room temperature. Thereafter, the master batch was placed in a heater roll mill and the sulfur, the vulcanization accelerator, the curing agent, the chemical foaming agent, and the urea foaming aid were added and mixed. Thus, 12 types of rubber compositions were prepared. Additionally, unvulcanized rubber molding bodies were formed from these rubber compositions.

The obtained unvulcanized rubber molding bodies formed from the 12 types of rubber compositions (Working Examples 1 to 6 and Comparative Examples 1 to 6) were loaded into a mold having a predetermined size (length: 100 mm, width: 100 mm). Then, the rubber molding bodies were heated and vulcanized at a temperature of 180° C. for 15 minutes. Thus, with the exception of Comparative Examples 1 and 4, vulcanization and foaming of the unvulcanized rubber molding bodies were carried out simultaneously, and foam rubber molded bodies having a thickness of about 15 mm were formed. The unvulcanized rubber molding bodies of Comparative Examples 1 and 4 were formed into vulcanized, non-foamed vulcanized rubber sheets.

The specific weight, expansion ratio Q, heat conductivity, and tan δ at 60° C. of the obtained foam rubber molded bodies (the non-foamed vulcanized rubber sheets for Comparative Examples 1 and 4) were each measured via the following methods. The obtained results are shown in Tables 1 and 2.

Specific Weight and Expansion Ratio Q

The specific weight $D0$ of the unvulcanized rubber molding bodies formed from the 12 types of rubber compositions and the specific weight $D1$ of the foamed/vulcanized foam rubber molded bodies were each measured at 23° C. in accordance with JISK-6268. The expansion ratio Q was calculated based on the specific weight $D0$ of the unvulcanized rubber molding bodies and the specific weight $D1$ of the foam rubber molded bodies according to formula (1) below.

$$\text{Expansion ratio } Q(\%) = [(D0/D1) - 1] \times 100 \quad (1)$$

The obtained results are shown in Tables 1 and 2.

Heat Conductivity

The heat conductivity of the foam rubber molded bodies was measured via a hot wire method in accordance with ISO8301, using a quick thermal conductivity meter (QTM-500, manufactured by Kyoto Electronics Manufacturing Co., Ltd.). The obtained results are shown in Tables 1 and 2.

Heat Buildup (tan δ at 60° C.)

The tan δ of the foam rubber molded bodies was measured using a viscoelastic spectrometer manufactured by Toyo Seiki Seisaku-sho, Ltd. Measuring conditions were: strain=10%±2%, frequency=20 Hz, and atmosphere temperature=60° C. The obtained results are shown in Tables 1 and 2.

TABLE 1

|  |  | Comparative Example 1 | Working Example 1 | Working Example 2 | Comparative Example 2 | Comparative Example 3 |
|---|---|---|---|---|---|---|
| NR1 | pbw | 40 | 40 | 40 | 40 | 40 |
| BR | pbw | 60 | 60 | 60 | 60 | 60 |
| CB1 | pbw | 50 | 50 | 50 | 50 | 50 |
| Zinc oxide | pbw | 3 | 3 | 3 | 3 | 3 |
| Stearic acid 1 | pbw | 2 | 2 | 2 | 2 | 2 |
| Antiaging agent 1 | pbw | 3 | 3 | 3 | 3 | 3 |

TABLE 1-continued

|  |  | Comparative Example 1 | Working Example 1 | Working Example 2 | Comparative Example 2 | Comparative Example 3 |
| --- | --- | --- | --- | --- | --- | --- |
| Wax | pbw | 1 | 1 | 1 | 1 | 1 |
| Oil 1 | pbw | 20 | 20 | 20 | 20 | 20 |
| Sulfur | pbw | 2 | 2 | 2 | 2 | 2 |
| Vulcanization accelerator 1 | pbw | 1 | 0.5 | 0.5 | 1 | 0.3 |
| Chemical foaming agent 1 | pbw | 0 | 5 | 8 | 2 | 15 |
| Specific weight | — | 1.08 | 0.63 | 0.47 | 0.77 | 0.40 |
| Expansion ratio Q | % | 0 | 72 | 130 | 41 | 171 |
| Heat conductivity | W/mK | 0.264 | 0.168 | 0.091 | 0.210 | 0.040 |
| Tanδ (60° C.) | — | 0.150 | 0.145 | 0.142 | 0.150 | 0.140 |

TABLE 2

|  |  | Comparative Example 4 | Working Example 3 | Comparative Example 5 | Comparative Example 6 | Working Example 4 | Working Example 5 | Working Example 6 |
| --- | --- | --- | --- | --- | --- | --- | --- | --- |
| NR2 | pbw | 60 | 60 | 60 | 60 | 60 | 60 | 60 |
| BR | pbw | 40 | 40 | 40 | 40 | 40 | 40 | 40 |
| CB2 | pbw | 60 | 60 | 60 | 60 | 60 | 60 | 60 |
| Zinc oxide | pbw | 3 | 3 | 3 | 3 | 3 | 3 | 3 |
| Stearic acid 2 | pbw | 2 | 2 | 2 | 2 | 2 | 2 | 2 |
| Antiaging agent 2 | pbw | 1 | 1 | 1 | 1 | 1 | 1 | 1 |
| Oil 2 | pbw | 10 | 10 | 10 | 10 | 10 | 10 | 10 |
| Resorcin resin | pbw |  |  |  |  | 2 | 2 | 5 |
| Sulfur | pbw | 1 | 1 | 1 | 1 | 1 | 1 | 1 |
| Vulcanization accelerator 2 | pbw | 0.8 | 0.8 | 1.2 | 0.4 | 0.8 | 0.8 | 0.4 |
| Curing agent | pbw |  |  |  |  | 4.5 | 4.5 | 8 |
| Chemical foaming agent 2 | pbw |  | 2.5 | 2.5 | 5 | 2.5 | 5 | 5 |
| Urea | pbw |  | 2 | 2 | 4 | 2 | 4 | 4 |
| Specific weight | — | 1.10 | 0.67 | 1.02 | 0.51 | 0.60 | 0.55 | 0.50 |
| Expansion ratio Q | % | 0 | 64 | 8 | 116 | 83 | 98 | 118 |
| Heat conductivity | W/mK | 0.270 | 0.188 | 0.260 | 0.123 | 0.157 | 0.139 | 0.120 |
| Tanδ (60° C.) | — | 0.150 | 0.158 | 0.144 | 0.185 | 0.127 | 0.123 | 0.132 |

The types of raw materials used in Tables 1 and 2 are shown below.
NR1: Natural rubber, SIR20 (manufactured by PT. NUSIRA)
NR2: Natural rubber, SIR2 (manufactured by PT. NUSIRA)
BR: Butadiene rubber, Nipol BR1220 (manufactured by Zeon Corporation)
CB1: Carbon black (FEF grade), HTC-100 (manufactured by Chubu Carbon Co., Ltd.))
CB2: Carbon black, Seast F (manufactured by Tokai Carbon Co., Ltd.)
Zinc oxide: Zinc Oxide #3 (manufactured by Seido Chemical Industry Ltd.)
Stearic acid 1: Beads Stearic Acid YR (manufactured by NOF Corp.)
Stearic acid 2: Beads Stearic Acid Kiri (manufactured by Chiba Fatty Acid Co., Ltd.)
Antiaging agent 1: SANTOFLEX 6PPD (manufactured by FLEXSYS)
Antiaging agent 2: VULKANOX 4020 (manufactured by Bayer)
Wax: Paraffin wax
Oil 1: Aromatic oil, A-OMIX (manufactured by Sakyo Yuka Kogyo K.K.)
Oil 2: Diana Process Oil NH-60 (manufactured by Idemitsu Kosan Co., Ltd.)
Resorcin resin: Penacolite Resin B-18-S (manufactured by INDSPEC Chemical)
Sulfur: Golden Flower Sulfur Powder 150 mesh (manufactured by Tsurumi Chemical)
Vulcanization Accelerator 1: Noccelar M (manufactured by Ouchi Shinko Chemical Industrial Co., Ltd.)
Vulcanization Accelerator 2: Noccelar CZ-G (manufactured by Ouchi Shinko Chemical Industrial Co., Ltd.)
Curing agent: Partial condensation product of pentamethoxymethylol melamine Sumikanol 507A (manufactured by BARA Chemical)
Chemical foaming agent 1: Nitroso foaming agent, Cellular CK#54 (manufactured by Eiwa Chemical Ind. Co., Ltd.)
Chemical foaming agent 2: Nitroso foaming agent, Cellular-D (manufactured by Eiwa Chemical Ind. Co., Ltd.), combined with the urea foaming aid below to adjust the decomposition starting temperature to 130° C.
Urea: Urea foaming aid, Cellpaste K4 (manufactured by Eiwa Chemical Ind. Co., Ltd.)

Fabrication and Evaluation of the Pneumatic Tires

Working Examples 7 to 12 and Comparative Examples 7 to 13

13 types of pneumatic tires were fabricated (Working Examples 7 to 12 and Comparative Examples 7 to 13) having a tire size of 195/65R15, a basic construction of the tires was that illustrated in FIG. 1, and the side wall portions 3 were formed from the 12 types of rubber compositions obtained as described above. Average thicknesses of the side wall portions 3 were varied as shown in Tables 3 and 4.

Each of the obtained 13 types of tires was evaluated for tire weight, rolling resistance, and side cracking resistance according to the test methods described below. Evaluation results are shown in Tables 3 and 4.

Tire Weight

The weight of each of the tires was measured and the results were indexed and recorded in Tables 3 and 4, with the index value of Comparative Example 7 being set to 100. Smaller index values indicate lighter weight of the tire.

Rolling Resistance

Each tire was assembled on a rim (size: 15×6J) and inflated to an air pressure of 230 kPa. Using an indoor drum tester (drum diameter: 1,707 mm), rolling resistance values were measured in accordance with JISD4234 under the following conditions: load=4.5 kN, speed=80 km/hour. The rolling resistance values were indexed and recorded in Tables 3 and 4. In Table 3, the index value of Comparative Example 7 was set to 100, and in Table 4, the index value of Comparative Example 11 was set to 100. Smaller index values indicate lower rolling resistance.

Side Cracking Resistance

Each tire was assembled on a rim (size: 15×6J) and inflated to an air pressure of 230 kPa. A cut at an angle of 45° with respect to a tire cross-sectional direction having a depth of 0.5 mm and a width of 5 mm was made at the maximum width position. Then, each tire was attached to the drum of the indoor drum tester (drum diameter: 1,707 mm) and was run under the following conditions: applied load=440 kg, speed=81 km/hour, distance=5,000 m. After the running, the length of the cut in the tire was measured, the inverse of the difference between the cut lengths before and after the running was calculated, and side cracking resistance was evaluated. The results were indexed and recorded in Tables 3 and 4. In Table 3, the index value of Comparative Example 7 was set to 100, and in Table 4, the index value of Comparative Example 11 was set to 100. Greater index values indicate superior side cracking resistance.

TABLE 3

| | | Comparative Example 7 | Working Example 7 | Working Example 8 | Comparative Example 8 | Comparative Example 9 | Comparative Example 10 |
|---|---|---|---|---|---|---|---|
| Side wall portion configuration | Type of rubber composition | Comparative Example 1 | Working Example 1 | Working Example 2 | Comparative Example 1 | Comparative Example 2 | Comparative Example 3 |
| | Average thickness (mm) | 3.0 | 3.0 | 3.0 | 1.5 | 3.0 | 3.0 |
| Tire weight | Index value | 100 | 93 | 91 | 92 | 96 | 90 |
| Rolling resistance | Index value | 100 | 97 | 95 | 98 | 100 | 94 |
| Side cracking resistance | Index value | 100 | 100 | 100 | 92 | 100 | 91 |

TABLE 4

| | | Comparative Example 11 | Working Example 9 | Comparative Example 12 | Comparative Example 13 | Working Example 10 | Working Example 11 | Working Example 12 |
|---|---|---|---|---|---|---|---|---|
| Side wall portion configuration | Type of rubber composition | Comparative Example 4 | Working Example 3 | Comparative Example 5 | Comparative Example 6 | Working Example 4 | Working Example 5 | Working Example 6 |
| | Average thickness (mm) | 3.0 | 3.0 | 3.0 | 3.0 | 3.0 | 3.0 | 3.0 |
| Tire weight | Index value | 100 | 94 | 99 | 92 | 94 | 93 | 92 |
| Rolling resistance | Index value | 100 | 97 | 100 | 100 | 95 | 94 | 93 |
| Side cracking resistance | Index value | 100 | 100 | 100 | 100 | 100 | 100 | 100 |

From Tables 3 and 4, it is clear that, compared to the comparative tires (of Comparative Examples 7 to 10 and 11 to 13), the tires of the present invention (of Working Examples 7 to 8 and 9 to 14) displayed improved rolling resistance while maintaining side cracking resistance. Note that in Comparative Example 8, the thickness of the non-foam rubber layer forming the side wall portion was insufficient and, as a result, side cracking resistance was worse compared to Comparative Examples 7. In Comparative Example 9, the heat conductivity of the foam rubber layer forming the side wall portion was excessively high and, as a result, the effects of reducing the rolling resistance were not obtained. In Comparative Example 10, the expansion ratio of the foam rubber layer was increased and, as a result, the side cracking resistance was negatively affected.

Working Examples 13 and 14

The tires of the present invention (of Working Examples 13 and 14) were fabricated having a tire size of 195/65R15 and the tire construction illustrated in FIG. 2. The average thickness of the non-foam rubber layer (the rubber layer 3a) in the side wall portion 3 was 0.6 mm and the average thickness of the foam rubber layer (the rubber layer 3b) was 2.4 mm. In both tires, the non-foam rubber layer (the rubber layer 3a) was formed from the rubber composition of Comparative Example 1. The type of rubber composition used to form the foam rubber layer (the rubber layer 3b) was selected from the rubber compositions of Working Examples 1 and 2, as shown in Table 5.

Each of these two types of tires was evaluated for tire weight, rolling resistance, and side cracking resistance according to the test methods described above. Evaluation results, along with the evaluation results of Comparative Example 7, are shown in Table 5. Note that the Comparative Example 7 served as a reference score (100) for the tire weight, rolling resistance, and side cracking resistance of the tires of Working Examples 13 and 14.

TABLE 5

|  |  | Comparative Example 7 | Working Example 13 | Working Example 14 |
|---|---|---|---|---|
| Side wall portion configuration | Rubber composition of the foam rubber layer | None | Working Example 1 | Working Example 2 |
| | Average thickness (mm) | 0.0 | 2.4 | 2.4 |
| | Rubber composition of the non-foam rubber layer | Comparative example 1 | Comparative example 1 | Comparative example 1 |
| | Average thickness (mm) | 3.0 | 0.6 | 0.6 |
| Tire weight | Index value | 100 | 95 | 93 |
| Rolling resistance | Index value | 100 | 98 | 96 |
| Side cracking resistance | Index value | 100 | 100 | 100 |

From Table 5, it is clear that, compared to the comparative tire (of Comparative Example 7), the tires of the present invention (of Working Examples 13 and 14) displayed improved rolling resistance while maintaining side cracking resistance.

Working Examples 15 to 18

The tires of the present invention (of Working Examples 15 to 18) were fabricated having a tire size of 195/65R15 and the tire construction illustrated in FIG. 2. The average thickness of the rubber layer forming the side wall portion 3 was 3 mm. In each tire, the foam rubber layer (the rubber layer 3b) in the side wall portion 3 was formed by the rubber composition of Working Example 1, and the non-foam rubber layer (the rubber layer 3a) was formed by the rubber composition of Comparative Example 1. The volume proportion of the foam rubber layer (the rubber layer 3b) with respect to the total volume of the rubber layers forming the side wall portion 3 was varied as shown in Table 6.

Each of these four types of tires was evaluated for tire weight, rolling resistance, and side cracking resistance according to the test methods described above. Evaluation results, along with the evaluation results of Comparative Example 7, are shown in Table 6. Note that the Comparative Example 7 served as a reference score (100) for the tire weight, rolling resistance, and side cracking resistance of the tires of Working Examples 15 to 18.

TABLE 6

|  |  | Comparative Example 7 | Working Example 15 | Working Example 16 | Working Example 17 | Working Example 18 |
|---|---|---|---|---|---|---|
| Side wall portion configuration (average thickness: 3 mm) | Rubber composition of the foam rubber layer | None | Working Example 1 | Working Example 1 | Working Example 1 | Working Example 1 |
| | Volume proportion of the foam rubber layer (%) | 0 | 80 | 50 | 30 | 20 |
| | Rubber composition of the non-foam rubber layer | Comparative Example 1 | Comparative Example 1 | Comparative Example 1 | Comparative Example 1 | Comparative Example 1 |

TABLE 6-continued

|  |  | Comparative Example 7 | Working Example 15 | Working Example 16 | Working Example 17 | Working Example 18 |
|---|---|---|---|---|---|---|
| Tire weight | Index value | 100 | 95 | 97 | 98 | 99 |
| Rolling resistance | Index value | 100 | 97 | 98 | 99 | 100 |
| Side cracking resistance | Index value | 100 | 100 | 100 | 100 | 100 |

From Table 6, it is clear that, compared to the pneumatic tire of Comparative Example 7, the pneumatic tires of Working Examples 15 to 17, where the volume proportion of the foam rubber layer (the rubber layer 3b) was not less than 30%, displayed improved rolling resistance while maintaining side cracking resistance. Note that in Working Example 18, where the volume proportion of the foam rubber layer (the rubber layer 3b) was less than 30%, the effects of reducing the rolling resistance were confirmed to be insufficient.

| Description of Symbols | |
|---|---|
| 1: | Pneumatic tire |
| 2: | Bead portion |
| 3: | Side wall portion |
| 4: | Tread portion |
| 5: | Carcass layer |
| 6: | Foam rubber layer |

What is claimed is:

1. A pneumatic tire comprising a left-right pair of bead portions, a side wall portion continuous with the bead portions, and a tread portion connected to the side wall portion, a carcass layer being mounted between the left-right bead portions: wherein
a foam rubber layer extending in a tire radial direction is disposed in at least a portion of the side wall portion, heat conductivity at 23° C. of the foam rubber layer is from 0.05 to 0.20 W/mK, a tan δ at 60° C. of the foam rubber layer is not more than 0.17, and an expansion ratio Q as defined in formula (I) below is from 50 to 160%:

Expansion ratio $Q(\%)=[(D0/D1)-1]\times 100$ (1)

wherein, D0 is a specific weight of the foam rubber layer before foaming and D1 is a specific weight after foaming.

2. The pneumatic tire according to claim 1, wherein the side wall portion comprises a plurality of rubber layers disposed on an outer side in a tire width direction of the carcass layer, and at least one layer of the plurality of rubber layers is constituted by the foam rubber layer.

3. The pneumatic tire according to claim 1, wherein the side wall portion comprises a single rubber layer disposed on the outer side in the tire width direction of the carcass layer, and the rubber layer is constituted by the foam rubber layer.

4. The pneumatic tire according to claim 3, wherein a region positioned on an outer side in the tire radial direction of the foam rubber layer is formed by a non-foam rubber layer instead of the foam rubber layer.

5. The pneumatic tire according to claim 1, wherein the foam rubber layer constitutes not less than 30% of the volume of the rubber layer forming the side wall portion.

6. The pneumatic tire according to claim 1, wherein the foam rubber layer is formed from a foaming rubber composition, and the foaming rubber composition comprises a diene rubber and, per 100 parts by weight thereof, from 0.1 to 20 parts by weight of a chemical foaming agent, from 1 to 10 parts by weight of resorcin or resorcin resin, and from 1 to 15 parts by weight of a curing agent of the resorcin and the resorcin resin.

7. The pneumatic tire according to claim 6, wherein the foaming rubber composition comprises from 20 to 100 parts by weight of a filler per 100 parts by weight of the diene rubber.

8. The pneumatic tire according to claim 6, wherein the curing agent of the resorcin and the resorcin resin that are included in the foaming rubber composition is polyvalent methoxymethylol melamine and/or hexamethylene tetramine.

9. The pneumatic tire according to claim 6, wherein the chemical foaming agent included in the foaming rubber composition is a nitroso foaming agent and/or an azo foaming agent.

10. The pneumatic tire according to claim 6, wherein the foaming rubber composition comprises from 0.1 to 20 parts by weight of urea per 100 parts by weight of the diene rubber.

11. The pneumatic tire according to claim 6, wherein the diene rubber included in the foaming rubber composition comprises not less than 20 wt % of a natural rubber.

12. The pneumatic tire according to claim 2, wherein a reinforcing rubber layer comprising coated fiber cords is disposed so as to be adjacent to the foam rubber layer.

13. The pneumatic tire according to claim 12, wherein the fiber cords comprise at least one type of fiber selected from the group consisting of polyester fiber, rayon fiber, and polyamide fiber.

* * * * *